United States Patent
Shimizu

(10) Patent No.: US 11,533,412 B2
(45) Date of Patent: Dec. 20, 2022

(54) FACSIMILE, CONTROL METHOD, AND NON-TRANSITORY COMPUTER-EXECUTABLE STORAGE MEDIUM

(71) Applicant: Yoshino Shimizu, Kanagawa (JP)

(72) Inventor: Yoshino Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/192,952

(22) Filed: Mar. 5, 2021

(65) Prior Publication Data

US 2021/0289101 A1   Sep. 16, 2021

(30) Foreign Application Priority Data

Mar. 16, 2020 (JP) .............................. JP2020-045328
Feb. 18, 2021 (JP) .............................. JP2021-024217

(51) Int. Cl.
  *H04N 1/387* (2006.01)
  *H04N 1/00* (2006.01)
(52) U.S. Cl.
  CPC ....... *H04N 1/3876* (2013.01); *H04N 1/00411* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 6,249,356 B1* | 6/2001 | Yoshikawa | ........ | H04N 1/32432 |
| | | | | 358/404 |
| 8,793,586 B2* | 7/2014 | Yoshida | ................ | G06F 3/1204 |
| | | | | 358/1.15 |
| 9,041,961 B2* | 5/2015 | Aritomi | ............ | H04N 1/00225 |
| | | | | 358/1.15 |
| 2015/0055175 A1* | 2/2015 | Iida | ....................... | G06F 3/1205 |
| | | | | 358/1.15 |
| 2018/0241910 A1* | 8/2018 | Onishi | ............... | H04N 1/32106 |
| 2018/0376018 A1* | 12/2018 | Yamada | ................ | G06F 3/1285 |
| 2019/0260905 A1* | 8/2019 | Takezawa | .......... | H04N 1/32363 |

FOREIGN PATENT DOCUMENTS

| | | |
|---|---|---|
| JP | 2002-027161 | 1/2002 |
| JP | 2002-261972 | 9/2002 |
| JP | 2005-197964 | 7/2005 |
| JP | 2005-341343 | 12/2005 |
| JP | 2007-157073 | 6/2007 |

* cited by examiner

*Primary Examiner* — Helen Zong
(74) *Attorney, Agent, or Firm* — Harness, Dickey & Pierce, P.L.C.

(57) ABSTRACT

A facsimile includes a memory and circuitry. The memory stores a plurality of pieces of image information. The circuitry is configured to identify unprocessed information, which is information on which particular processing has not performed yet, among the plurality of pieces of image information, enable specific processing to be performed collectively on a plurality of pieces of the unprocessed information among the plurality of pieces of image information, and collectively perform the specific processing on the plurality of pieces of the unprocessed information.

16 Claims, 11 Drawing Sheets

FIG. 3A

Select Folder

Ma

| | | Month/Day ▶ | ▦ → | |
|---|---|---|---|---|
| | | Initial Inbox Folder | | Number of Unread Documents: 10 |
| 001 | | 📁 Folder01 | Created Date/Time: 11/21 00:00 | Number of Unread Documents: 03 |
| 002 | | 📁 Folder02 | Created Date/Time: 11/21 00:00 | Number of Unread Documents: 01 |
| 003 | | 📁 Folder03 | Created Date/Time: 11/21 00:00 | Number of Unread Documents: 00 |
| 004 | | 📁 Folder04 | Created Date/Time: 11/21 00:00 | Number of Unread Documents: 05 |
| 005 | | 📁 Folder05 | Created Date/Time: 11/21 00:00 | Number of Unread Documents: |

[ Print/Transfer All Unread Documents ] — Ba (First Mode)

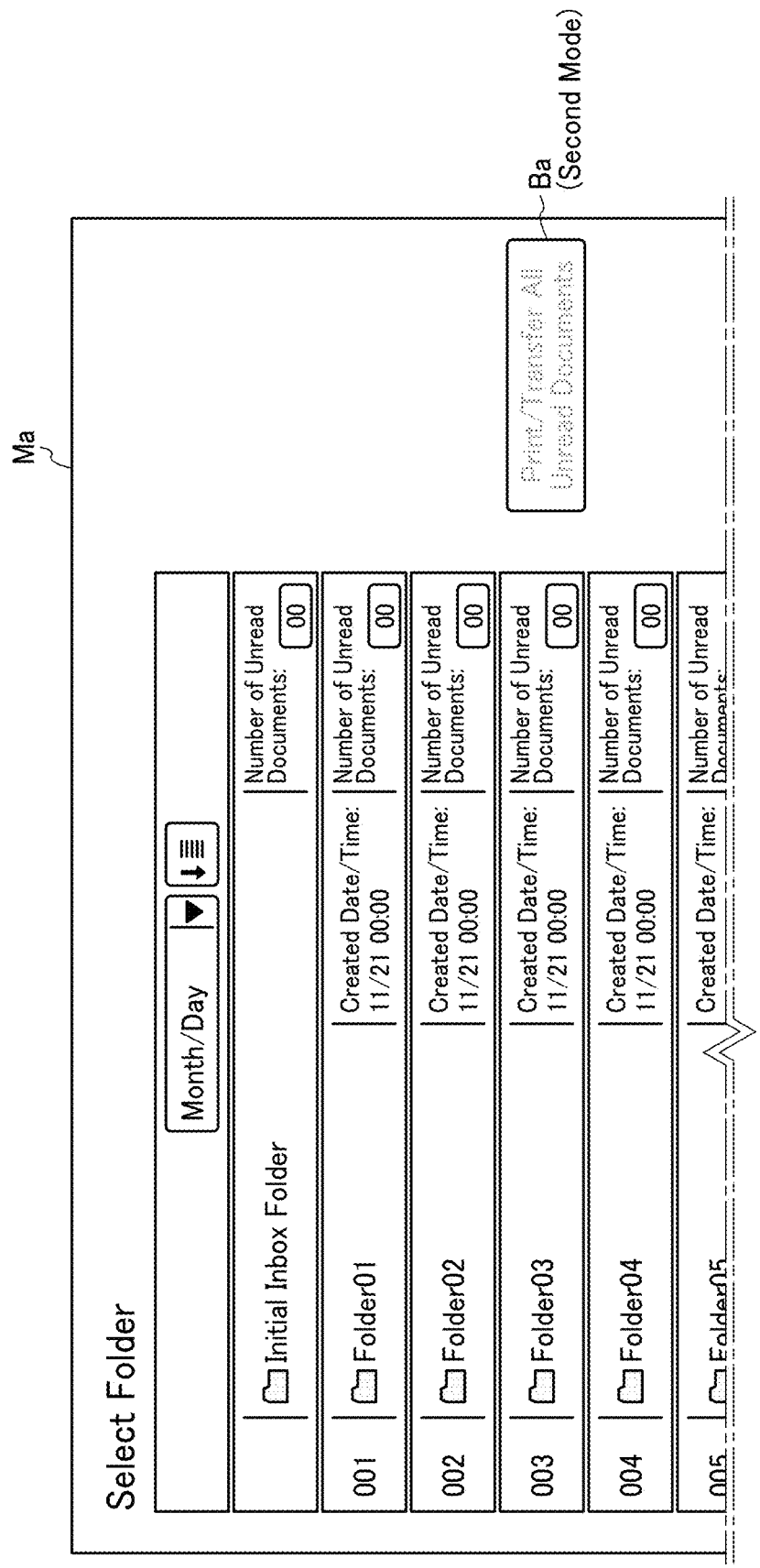

FIG. 6A

| ID | SENDER INFORMATION | MATCH CONDITION | DESTINATION FOLDER FOR STORAGE |
|---|---|---|---|
| 01 | AAA CORPORATION | EXACT MATCH | Folder01 |
| 02 | BBB, INC. | EXACT MATCH | Folder02 |
| 03 | CCC | PARTIAL MATCH | Folder03 |
| ... | | | |

FIG. 6B

| ID | RECEPTION DATE/TIME | SENDER | DESTINATION FOLDER FOR STORAGE | FILE NAME | NUMBER OF PAGES | READ/UNREAD | |
|---|---|---|---|---|---|---|---|
| 01 | 2020/03/10 11:00:00 | xxx-xxxx-xxxx | Folder01 | 001.pdf | 1 | READ | ~DT |
| 02 | 2020/03/11 12:00:00 | yyy-yyyy-yyyy | Folder02 | 002.pdf | 1 | READ | ~DT |
| 03 | 2020/03/13 13:00:00 | xxx-xxxx-xxxx | Folder01 | 003.pdf | 2 | UNREAD | ~DT |
| 04 | 2020/03/14 14:00:00 | xxx-xxxx-xxxx | Folder01 | 004.pdf | 2 | UNREAD | ~DT |
| 05 | 2020/03/15 15:00:00 | xxx-xxxx-xxxx | Folder01 | 005.pdf | 1 | UNREAD | ~DT |
| 06 | 2020/03/16 16:00:00 | yyy-yyyy-yyyy | Folder02 | 006.pdf | 3 | UNREAD | ~DT |
| ... | | | | | | | |

FIG. 7A

List of Folders of Stored Received Documents   Ma

Month/Day ▶ ⇶→

| | | Created Date/Time: | Number of Unread Documents: |
|---|---|---|---|
| 001 | 📁 Initial Inbox Folder | | 10 |
| 002 | 📁 AAA Corporation | 11/21 00:00 | 03 |
| 003 | 📁 BBB, Inc. | 11/21 00:00 | 01 |
| 004 | 📁 CCC Trading | 11/21 00:00 | 00 |
| 005 | 📁 DDD Corporation | 11/21 00:00 | 05 |
| | 📁 Folder05 | 11/21 00:00 | |

- Preview — Bf
- Print — Bg
- Transfer — Bh
- Print/Transfer All Unread Documents — Ba
- Delete — Bi

FIG. 7B

List of Stored Received Documents

| | | Bf Preview |
| | | Bg Print |
| | | Bh Transfer |
| | | Ba Print/Transfer All Unread Documents |
| | | Bi Delete |

| Month/Day ▶ | ▤→ | Number of Unread Documents: 3 |

| Reception Date/Time 2020/03/10 11:00:00 | Sender XXX-XXXX-XXXX | Original 1 | Read |
| Reception Date/Time 2020/03/13 13:00:00 | Sender XXX-XXXX-XXXX | Original 2 | Unread |
| Reception Date/Time 2020/03/14 14:00:00 | Sender XXX-XXXX-XXXX | Original 2 | Unread |
| Reception Date/Time 2020/03/15 15:00:00 | Sender XXX-XXXX-XXXX | Original 1 | Unread |

FACSIMILE, CONTROL METHOD, AND NON-TRANSITORY COMPUTER-EXECUTABLE STORAGE MEDIUM

CROSS-REFERENCE TO RELATED APPLICATIONS

This patent application is based on and claims priority under 35 U.S.C. § 119(a) to Japanese Patent Application Nos. 2020-045328, filed on Mar. 16, 2020, and 2021-024217, filed on Feb. 18, 2021, in the Japan Patent Office, the entire disclosures of which are incorporated herein by reference herein.

BACKGROUND

Technical Field

The present disclosure relates to a facsimile, a control method, and a non-transitory computer-executable storage medium.

Related Art

Facsimiles that perform specific processing (e.g., a transmission processing) on image information are known. For example, a facsimile is known that includes a storage configured to store a plurality pieces of image information and allows a user to designate any one or more of the plurality pieces of image information. In the facsimile having the above-described configuration the specific processing is performed on the image information designated by the user.

SUMMARY

According to one aspect, a facsimile includes a memory and circuitry. The memory stores a plurality of pieces of image information. The circuitry is configured to identify unprocessed information, which is information on which particular processing has not performed yet, among the plurality of pieces of image information, enable specific processing to be performed collectively on a plurality of pieces of the unprocessed information among the plurality of pieces of image information, and collectively perform the specific processing on the plurality of pieces of the unprocessed information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3A is a schematic diagram of a specific example of a start screen, according to an embodiment of the present disclosure;

FIG. 3B is a schematic diagram of another specific example of the start screen, according to an embodiment of the present disclosure;

FIG. 6A is a conceptual diagram illustrating an example of a sort rule management table, according to an embodiment of the present disclosure;

FIG. 6B is a conceptual diagram illustrating an example of a received document management table, according to an embodiment of the present disclosure;

FIG. 7A is a schematic diagram illustrating an example of a start screen, according to an embodiment of the present disclosure;

FIG. 7B is a schematic diagram illustrating a specific example of an in-folder screen, according to an embodiment of the present disclosure.

Figure 1:
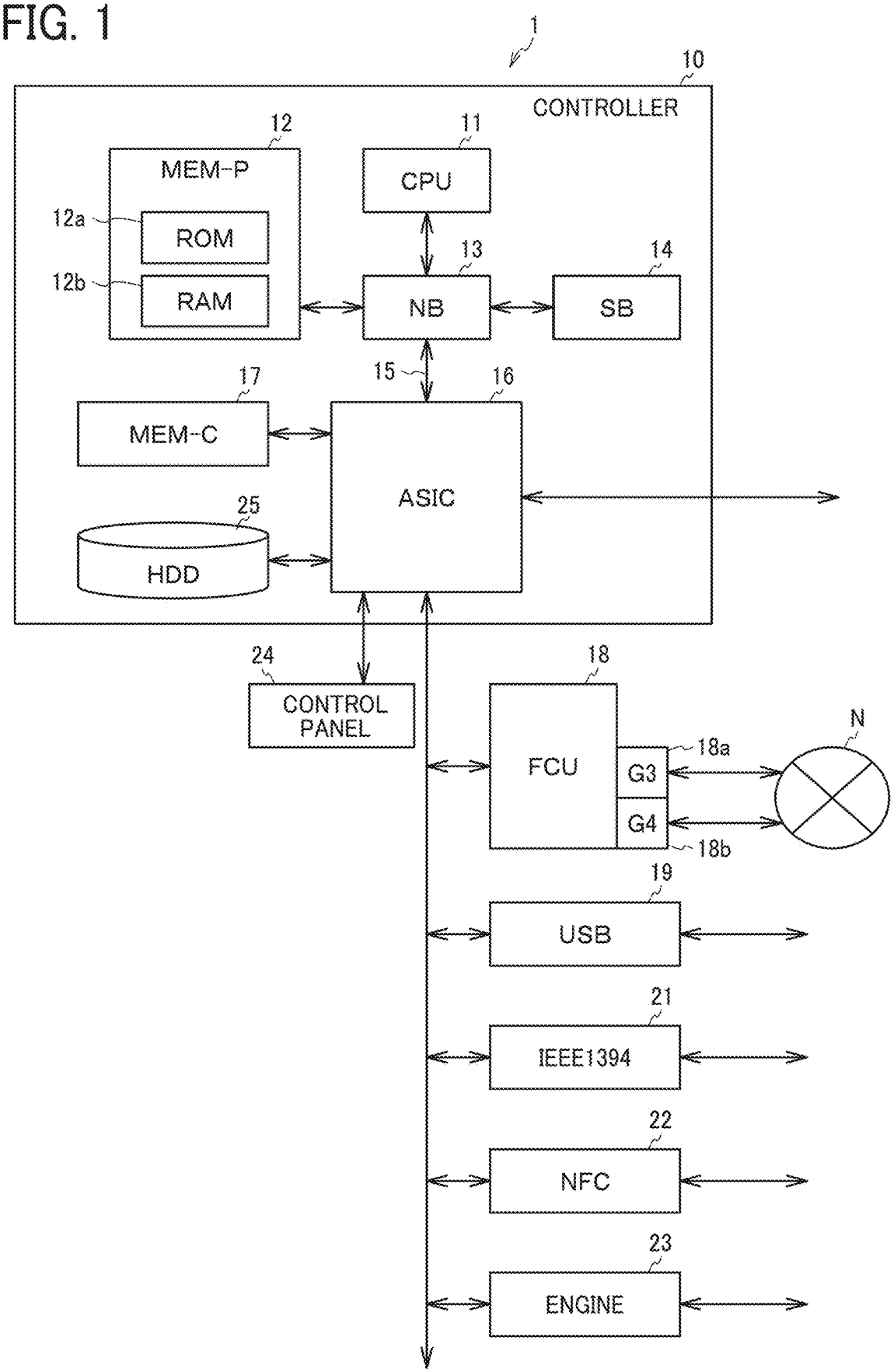
FIG. 1 is a block diagram illustrating an example of a hardware configuration of a multifunction peripheral (MFP) as an example of a facsimile, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present disclosure. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Several example embodiments of the present disclosure are described hereinafter with reference to drawings. An example in which the present disclosure is applied to a multifunction peripheral (MFP) having a facsimile function is described. It should be noted that the present disclosure can be applied to any suitable devices or apparatuses other than the MFP. The MFP has a scanning function in addition to the facsimile function.

FIG. 1 is a block diagram illustrating an example of a hardware configuration of an MFP 1, according to the present embodiment. As illustrated in FIG. 1, the MFP 1 includes a controller 10 and an engine 23. The controller 10 and the engine 23 are connected by a peripheral component interconnect (PCI) bus.

The controller 10 controls overall operation of the MFP 1, such as drawing and communicating, and also controls inputs from an operation unit. The engine 23 is, for example, a printer engine that is connectable to the PCI bus. Examples of engine 23 include a monochrome plotter, a single-drum color plotter, a four-drum color plotter, a scanner, and a facsimile unit.

The controller 10 includes a central processing unit (CPU) 11, a north bridge (NB) 13, a system memory (MEM-P) 12, a south bridge (SB) 14, a local memory (MEM-C) 17, an application-specific integrated circuit (ASIC) 16, and a hard disk drive (HDD) 25. The NB 13 and the ASIC 16 are connected by an accelerated graphics port (AGP) bus 15. Further, the MEM-P 12 includes a read only memory (ROM) 12a and a random access memory (RAM) 12b.

The CPU 11 controls overall operation of the MFP 1, and includes a chipset including the NB 13, the MEM-P 12, and the SB 14. The CPU 11 is connected to other devices via the chipset. The NB 13 is a bridge that connects the CPU 11, the MEM-P 12, the SB 14, and the AGP bus 15 to one another. The NB 13 includes a memory controller that controls reading and writing data to and from the MEM-P 12, a PCI master, and an AGP target. The MEM-P 12 is a system memory used as, for example, a memory to store programs or data, a memory to deploy programs or data, and a memory to store drawing data for printing. The MEM-P 12 Includes the ROM 12a and the RAM 12b.

The ROM 12a is a read only memory used as a memory to store programs or data. The RAM 12b is a read-write memory used as, for example, a memory to deploy programs or data and a memory to store drawing data for printing. The SB 14 is a bridge that connects the NB 13 with a PCI device or a peripheral device. The SB 14 is connected to the NB 13 via the PCI bus. The network interface (I/F) may be also connected to the PCI bus.

The ASIC 16 is an integrated circuit (IC) dedicated to an image processing use, and connects the AGP bus 15, the PCI bus, the HDD 25, and the MEM-C 17. The ASIC 16 includes a PCI target, an AGP master, an arbiter (ARB), which is a core of the ASIC 16, a memory controller that controls the MEM-C 17, a plurality of direct memory access controllers (DMACs) that performs rotation or the like of image data with a hardware logic, and a PCI unit that exchanges data with the engine 23 through the PCI bus.

The ASIC 16 is connected to a facsimile control unit (FCU) 18, a universal serial bus (USB) 19, and the Institute of Electrical and Electronics Engineers 1394 (IEEE 1394) interface 21 through the PCI bus. A control panel 24 is directly connected to the ASIC 16. The MEM-C 17 is a local memory, which is used as a buffer storing image data to be copied or a buffer storing data to be coded.

The AGP bus 15 is a bus interface for a graphics accelerator card that is devised for accelerating graphic processing. The AGP bus 15 directly accesses the MEM-P 12 with high throughput to accelerate the graphics accelerator card.

The FCU 18 is hardware that controls the facsimile function. Specifically, the FCU 18 is connected to a communication line N (e.g., a telephone line) and communicates with an external device by using the facsimile function. For example, the FCU 18 receives image information from an external facsimile through the communication line N. The image information is image data representing an image (e.g., an image of a document). Further, the FCU 18 transmits the image information to an external device through the communication line N.

As illustrated in FIG. 1, the FCU 18 is provided with a G3 terminal 18a and a G4 terminal 18b. The FCU 18 transmits and receives image information Da in compliance with G3 protocol communication via the G3 terminal 18a. Further, the FCU 18 transmits and receives image information Da in compliance with G4 protocol communication via the G4 terminal 18b. It should be noted that the interface used for transmitting and receiving image information Da is not limited to the above examples. For example, only one of the G3 terminal 18a and the G4 terminal 18b may be provided.

The HDD 25 of the controller 10 is a storage that stores image data, programs, font data, and forms. The HDD 25 stores a program file of application software executed at the MFP 1.

Figure 2A:
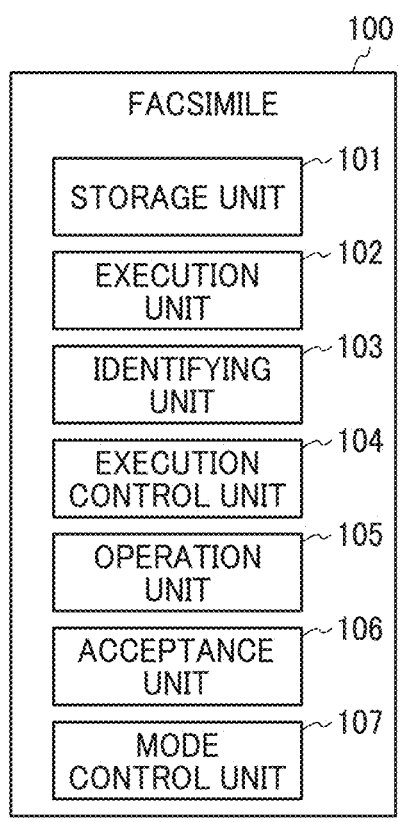
FIGS. 2A and 2B are block diagrams, each illustrating an example of a functional configuration of the facsimile, according to an embodiment of the present disclosure.

FIG. 2A is a block diagram illustrating an example of a functional configuration of a facsimile 100 (MFP 1), according to the present embodiment. For example, the MFP 1 functions as the facsimile 100 when the CPU 11 executes a program. As illustrated in FIG. 2A, the facsimile 100 includes a storage unit 101, an execution unit 102, an identifying unit 103, an execution control unit 104, an operation unit 105, an acceptance unit 106, and a mode control unit 107.

The storage unit 101 stores information including a plurality of pieces of image information DGs and a received document management table TB described below. Specifically, the facsimile 100 is communicable with another facsimile (counter machine). In response to receiving the image information DG from another facsimile, the facsimile 100 stores the received image information DG in the storage unit 101. It should be noted that image information other than the image information received from another facsimile may be stored in the storage unit 101. Further, the facsimile 100 registers information relating to the image information DG received from another facsimile in the received document management table TB stored in the storage unit 101. The facsimile 100 can receive the image information DG from other extraneous sources in addition to or in alternative go from another facsimile. For example, the facsimile 100 can receive the image information DG from an information processing apparatus such as a server apparatus that transmits an Internet fax.

The execution unit 102 performs a specific processing on the image information DG. Specifically, the execution unit 102 performs transmission processing of transmitting (transferring) the image information DG to an external device or apparatus. Further, the execution unit 102 performs print processing of printing an image represented by the image information DG. As described above, in the present embodiment, the "transmission processing" and the "print processing" are examples of the "specific processing" of the present disclosure. It should be noted that the transmission processing and print processing are just examples, and the specific processing can be any other suitable processing. The specific processing of the present disclosure can be outputting data, for example, to an external device or apparatus.

Further, the facsimile 100 performs particular processing in addition to the above-mentioned specific processing. Specifically, the facsimile 100 performs display processing of displaying an image represented by the image information DG. For example, when the display processing is executed, the image represented by the image information DG is displayed on the control panel 24 described above. For example, a user appropriately operates the control panel 24 to cause the facsimile 100 to perform the display processing on desired image information DG.

As described above, in the present embodiment, the "display processing" is an example of the "particular processing" of the present disclosure. It should be noted that the display processing is just an example, and the particular processing can be any other suitable processing. For example, a user appropriately operates a user terminal that is connected to the facsimile 100 through a network, to cause the user terminal to acquire desired image information DG from the facsimile 100 and display an image based on the acquired image information. In other words, the user can view an image represented by the image information DG on an external device such as the user terminal, the image information DG being provided by the facsimile 100 to the external device through a network. Therefore, the "particular processing" of the present disclosure can be "providing processing" to an external device to cause the external device to display an image represented by the image information DG.

When the display processing (particular processing) is performed on image information DG, a state an unprocessed flag f corresponding to the image information DG is updated from an ON state (numerical value "1") to an OFF state (numerical value "0"). The unprocessed flag f is stored in association with the image information DG stored the storage unit 101 described above. The facsimile 100 is configured to accept batch operation, as described below in detail. In response to accepting the batch operation, the execution unit 102 performs the transmission processing and/or the print processing collectively on a plurality of pieces of image information DGs, each being associated with the unprocessed flag f that is in the ON state.

Figure 2B:
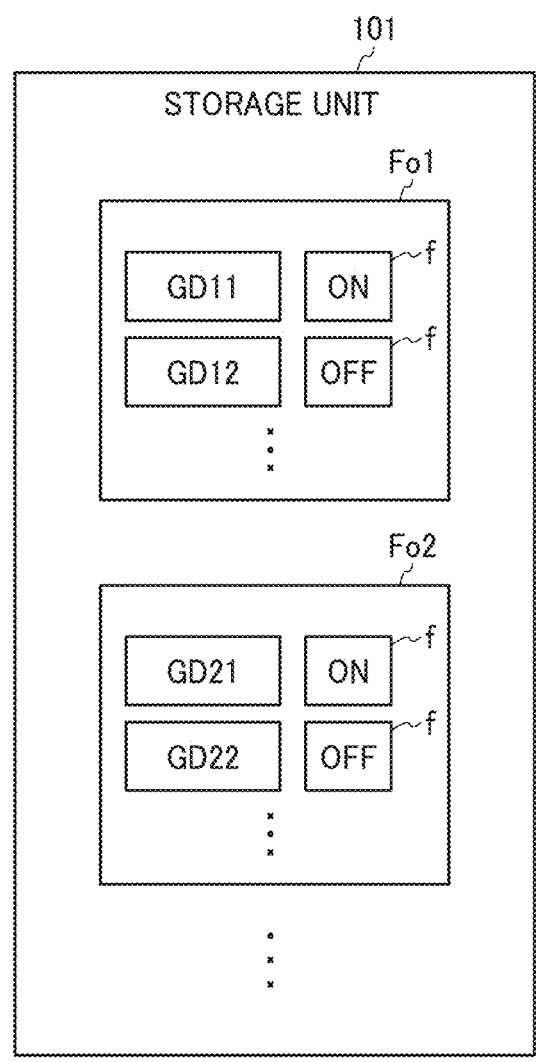

FIG. 2B is a diagram for describing the image information DG and the unprocessed flag f stored in the storage unit 101. As illustrated in FIG. 2B, a plurality pieces of image information DG are stored in a plurality of groups, respectively. Specifically, a plurality of folders Fo are provided in the storage unit 101. One or more pieces of the plurality pieces of image information DG are stored in any one of the folders Fo.

Further, an unprocessed flag f is stored in association with each of the plurality pieces of image information DG in the storage unit 101. In the present embodiment, the unprocessed flag f of the image information DG is turned on immediately after the image information DG is stored in the storage unit 101. Then, when the display processing is performed on the image information DG, the unprocessed flag f corresponding to the image information DG on which the display processing is performed is turned off. In other words, the unprocessed flag f of the image information DG representing an image that a user has not yet viewed is in the OFF state.

For example, as illustrated in FIG. 2B, among the plurality pieces of image information DG stored in the folder Fo1, the unprocessed flag f of image information DG11 is in the ON state, and the unprocessed flag f of image information DG12 is in the OFF state. In the present embodiment, the number of pieces of image information DG associated with the unprocessed flag f in the ON state is displayed to a user. Specifically, the number of pieces of image information DG associated with the unprocessed flag f in the ON state is displayed for each folder Fo (see FIG. 3A described below). In other words, with the configuration as described above, the number of pieces of image information DG on which the transmission processing and the print processing (specific processing) are to be performed by the above-described batch operation is displayed for each folder Fo.

The received document management table TB stores a file name of the image information DG, a storage destination folder in which the image information DG is stored, a read/unread state of the image information DG, and other information relating to the image information DG such as a reception date and time, a sender, and the number of pages, in association with each other. Further, the received document management table TB stores a file path of the above-described folder Fo as an item value of a storage destination folder item. Furthermore, the received document management table stores the above-described unprocessed flag as an item value of a read/unread state item. The unread state corresponds to the ON state of the unprocessed flag f, and the read state corresponds to the OFF state of the unprocessed flag f.

Referring again to FIG. 2A, the identifying unit 103 of the facsimile 100 identifies one or more pieces of image information on which the display processing (particular processing) has not been performed yet among the plurality pieces of image information DGs. Specifically, the identifying unit 103 identifies the image information DG associated with the unprocessed flag f in the ON state among the plurality of pieces of image information DGs stored in the storage unit 101. For example, the identifying unit 103 searches the received document management table TB for information whose item value of the read/unread state item is "unread", to identify the image information DG associated with the unprocessed flag f in the ON state. Hereinafter, the image information DG associated with the unprocessed flag f in the ON state may be referred to as "unprocessed information DG" in order to simplify the description. Further, the image information DG associated with the unprocessed flag f in the OFF state may be referred to as "processed information DG".

The execution control unit 104 enables the transmission processing and/or the print processing to be performed collectively on the plurality pieces of unprocessed information DG among the plurality pieces of image information DG. Specifically, the execution control unit 104 displays a start screen Ma (see FIG. 3A) and a selection screen Mb (see FIG. 4A), which are described below, according to an operation input by a user. The selection screen Mb becomes displayable after the start screen Ma is displayed. Further, during a time period in which the selection screen Mb is being displayed, the above-mentioned batch operation can be accepted.

The operation unit 105 is configured to be operated by a user. For example, a batch processing button (Ba in FIG. 3A described below) displayed on the control panel 24 described above functions as the operation unit 105. The operation unit 105 is an example of a graphical user interface component. The acceptance unit 106 accepts an operation on the operation unit 105. Specifically, the acceptance unit 106 accepts a touch operation on the operation unit 105 (batch processing button) during the time period in which the above-mentioned start screen Ma is being displayed.

The mode control unit 107 controls the operation unit 105 to be in a first mode during a time period in which an operation on the operation unit 105 can be accepted. Further, the mode control unit 107 controls the operation unit 105 to be in a second mode, which is different form the first mode, during a time period in which an operation on the operation unit 105 cannot be accepted. Specifically, during a time period in which the start screen Ma is being displayed and the unprocessed information DG is stored in the storage unit 101 (hereinafter referred to as "acceptable period"), an operation on the operation unit 105 can be accepted. During the acceptable period, the operation unit 105 is displayed in the first mode.

By contrast, during a time period in which the start screen Ma is being displayed and no unprocessed information DG is stored in the storage unit 101 (hereinafter referred to as "unacceptable period"), an operation on the operation unit 105 is cannot be accepted. During the unacceptable period, the operation unit 105 is displayed in the second mode. The above configuration enables a user to recognize whether the current time is the acceptable period or the unacceptable period by viewing the mode (the first mode or the second mode) of the operation unit 105. Example of the unacceptable period include a time period in which all of the plurality of pieces of image information DGs stored in the storage unit 101 have been already processed, and a time period in which no image information DG is stored in the storage unit 101.

FIG. 3A is a schematic diagram of a specific example of the start screen Ma. As illustrated in FIG. 3A, each character string "Folder" corresponding to each folder Fo stored in the storage unit 101 is displayed on the start screen Ma. Specifically, the start screen Ma displays a character string (an item value of the storage destination folder item in the received document management table TB) "Folder01" corresponding to the folder Fo1 in the storage unit 101, and a character string "Folder 02" corresponding to the folder Fo2 in the storage unit 101, for example. The character string corresponding to a given folder Fo indicates a name of the given folder Fo. Further, the start screen Ma displays a date and time (an item value of the reception date and time item in the received document management table TB) when each folder Fo is provided in the storage unit 101.

The start screen Ma of the present embodiment displays the number of pieces of the unprocessed information DG stored in the storage unit 101 for each folder Fo. Specifically, the number of item values "unread" of the read/unread state item for each storage destination folder in the received document management table TB is displayed. FIG. 3A indicates a specific example in which three pieces of the unprocessed information DG are stored in the folder Fo1, one piece of the unprocessed information DG is stored in the folder Fo2, and five pieces of the unprocessed information DG are stored in the folder Fo4, and no unprocessed information DG is stored in the folder Fo3.

Further, the start screen Ma displays the number of pieces of the unprocessed information DG that are not stored in a specific folder Fo. FIG. 3A indicates a specific example in which ten pieces of the unprocessed information DG that are not stored in the specific folder Fo are stored in the storage unit 101. As described above, when one or more pieces of unprocessed information DGs are stored in the storage unit 101, the display period of the start screen Ma is the acceptable period. In other words, FIG. 3A illustrates the specific example of the start screen Ma displayed during the acceptable period.

As illustrated in FIG. 3A, the start screen Ma includes the batch processing button Ba. The batch processing button Ba is displayed in the first mode during the acceptable period in which the one or more pieces of unprocessed information DGs are stored in the storage unit 101. Therefore, in the specific example of FIG. 3A, the batch processing button Ba is displayed in the first mode.

FIG. 3B is a schematic diagram of another specific example of the start screen Ma. Specifically, while FIG. 3A illustrates a specific example of the start screen Ma displayed during the acceptable period. FIG. 3B illustrates a specific example of the start screen Ma displayed in the unacceptable period. As described above, no unprocessed information DG is stored in the storage unit 101 during the unacceptable period. Therefore, in the specific example of FIG. 3B, information indicating that the number of unprocessed information DG stored in the storage unit 101 is zero.

As described above referring to FIG. 3A, the batch processing button Ba is displayed in the first mode during the acceptable period. By contrast, as illustrated in FIG. 3B, the batch processing button Ba is displayed in the second mode during the unacceptable period. For example, during the unacceptable period, the brightness of the batch processing button Ba is lower than that displayed during the acceptable period. It should be noted that the first mode and the second mode of the batch processing button Ba as described above are just examples, and the batch processing button Ba can be displayed in any other suitable manner, provided that the first mode and the second mode are distinguishable. In the present embodiment, a touch operation on the batch processing button Ba displayed in the first mode is accepted, and a touch operation to the batch processing button Ba displayed in the second mode is invalid.

Figure 4A:
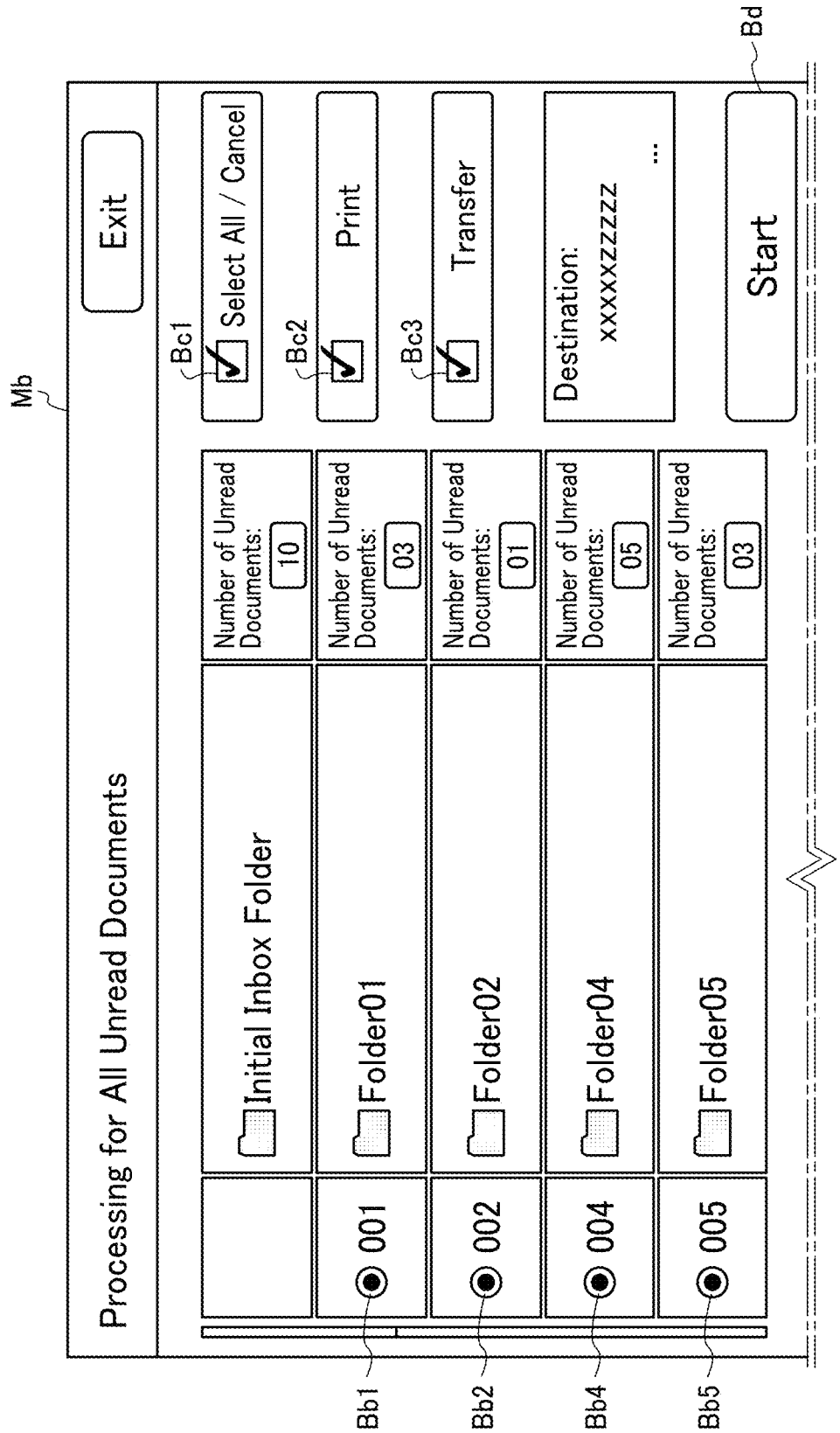
FIG. 4A is a schematic diagram illustrating a specific example of a selection screen, according to an embodiment of the present disclosure.

FIG. 4A is a schematic diagram illustrating a specific example of the selection screen Mb. The selection screen Mb is displayed in response to acceptance of a touch operation on the batch processing button Ba displayed on the start screen Ma. As illustrated in FIG. 4A, the selection screen Mb includes a designation button Bb, a selection button Bc (1 to 3), and an execution button Bd.

In substantially the same manner as the above-described start screen Ma (see FIG. 3A or FIG. 3B), the selection screen Mb displays a character string "Folder" (name of the folder Fo) corresponding to each of the folders Fo stored in the storage unit 101. Specifically, the start screen Ma displays the name(s) of one or more folders Fo in which one or more pieces of unprocessed information DGs are stored are displayed among the folders Fo stored the storage unit 101.

For example, FIG. 4A illustrates a specific example in which three pieces of the unprocessed information DG are stored in the folder Fo1, one piece of the unprocessed information DG is stored in the folder Fo2, five pieces of the unprocessed information DG are stored in the folder Fo4, three pieces of the unprocessed information DG are stored in the folder Fo5, and no unprocessed information DG is stored in the folder Fo3. In the above specific example, the names of the folder Fo1, the folder Fo2, the folder Fo4, and the folder Fo5 are displayed on the selection screen Mb, and the name of the folder Fo3 is not displayed on the selection screen Mb. In the substantially the same manner of the above-described start screen, the selection screen Mb displays the number of pieces of unprocessed information DG stored in each folder Fo.

The designation button Bb is displayed to allow a user to designate one or more desired pieces of unprocessed information DG on which the print processing and/or the transmission processing is to be performed. Specifically, the designation button Bb is displayed for each folder Fo. For example, in the specific example of FIG. 4A, a designation button Bb1 is displayed at a position corresponding to the folder Fo1. In substantially the same manner, a designation button Bb2 is displayed at a position corresponding to the folder Fo2, a designation button Bb4 is displayed at a position corresponding to the folder Fo4, and a designation button Bb5 is displayed at a position corresponding to the folder Fo5.

Each of the designation buttons Bb is displayed in one of a state in which the button is already designated and a state in which the button is not designated yet. Hereinafter, the state in which the designation button Bb is already designated may be referred to as a "designated state", and the state in which the designation button Bb is not designated yet may be referred to as a "non-designated state". Further, in response to a touch operation on the designation button Bb that is in the designated state, the designation button Bb on which the touch operation is switched to the non-designated state. In substantially the same manner, in response to a touch operation on the designation button Bb that is in the non-designated state, the designation button Bb on which the touch operation is performed is switched to the designated state. Hereinafter, the touch operation on the designation button Bb may be referred to as "designation operation", in order to simplify the description. FIG. 4A illustrates the specific example in which all the designation buttons Bb1 to Bb5 are in the designated state.

As described below in detail, in response to acceptance of the batch operation, the transmission processing and/or print processing is performed on one or more pieces of unprocessed information DGs stored in one or more folders Fo corresponding to the designation buttons in the designated state. In other words, the designation operation is an operation of designating the plurality of pieces of unprocessed information DG on which the transmission processing or the print processing is to be performed in response to the batch operation.

The selection button Bc is displayed to allow a user to select a desired type of the specific processing (print processing and/or transmission processing) to be performed in response to the batch operation. In the present embodiment, either one or both of the print processing and the transmission processing can be performed on the unprocessed information DG in response to the batch operation.

The selection button Bc is displayed either in a state in which the button is already selected or in a state in which the button is not selected yet. Hereinafter, the state in which the selection button Bc is already selected may be referred to as a "selected state", and the state in which the selection button Bc is not selected yet may be referred to as a "non-selected state". Further, in response to a touch operation on the selection button Bc that is in the selected state, the selection button Bc on which the touch operation is performed is switched to the non-selected state. In substantially the same manner, in response to a touch operation on the selection button Bc that is in the non-selected state, the selection button Bc on which the touch operation is performed is switched to the selected state. Hereinafter, the touch operation on the selection button Bc may be referred to as "selection operation", in order to simplify the description. FIG. 4A illustrates the specific example in which all the selection buttons Bc1 to Bc3 are in the selected state.

As illustrated in FIG. 4A, the selection button Bc includes the selection button Bc1, the selection button Bc2, and the selection button Bc3. When the batch operation is performed during a time period in which the selection button Bc2 is in the selected state, the print processing is performed on the unprocessed information DG. When the batch operation is performed during a time period in which the selection button Bc3 is in the selected state, the transmission processing is performed on the unprocessed information DG.

With the above configuration, when the batch operation is performed during a time period in which both the selection button Bc2 and the selection button Bc3 are in the selected state, both the print processing and the transmission processing are performed on the unprocessed information DG. When the selection button Bc1 is switched to the selected state in response to a selection operation, the selection button Bc2 and the selection button Bc3 are switched to the selected state at one time.

When the execution button Bd is touched, the print processing and the transmission processing are performed on the unprocessed information DG. In other words, the touch operation on the execution button Bd is an example of the batch operation. In the specific example of FIG. 4A, when the execution button is touched, both the print processing and the transmission processing are performed on the plurality pieces of the unprocessed information DG in the folder Fo1, the folder Fo2, the folder Fo4, and the folder Fo5.

Figure 4B:
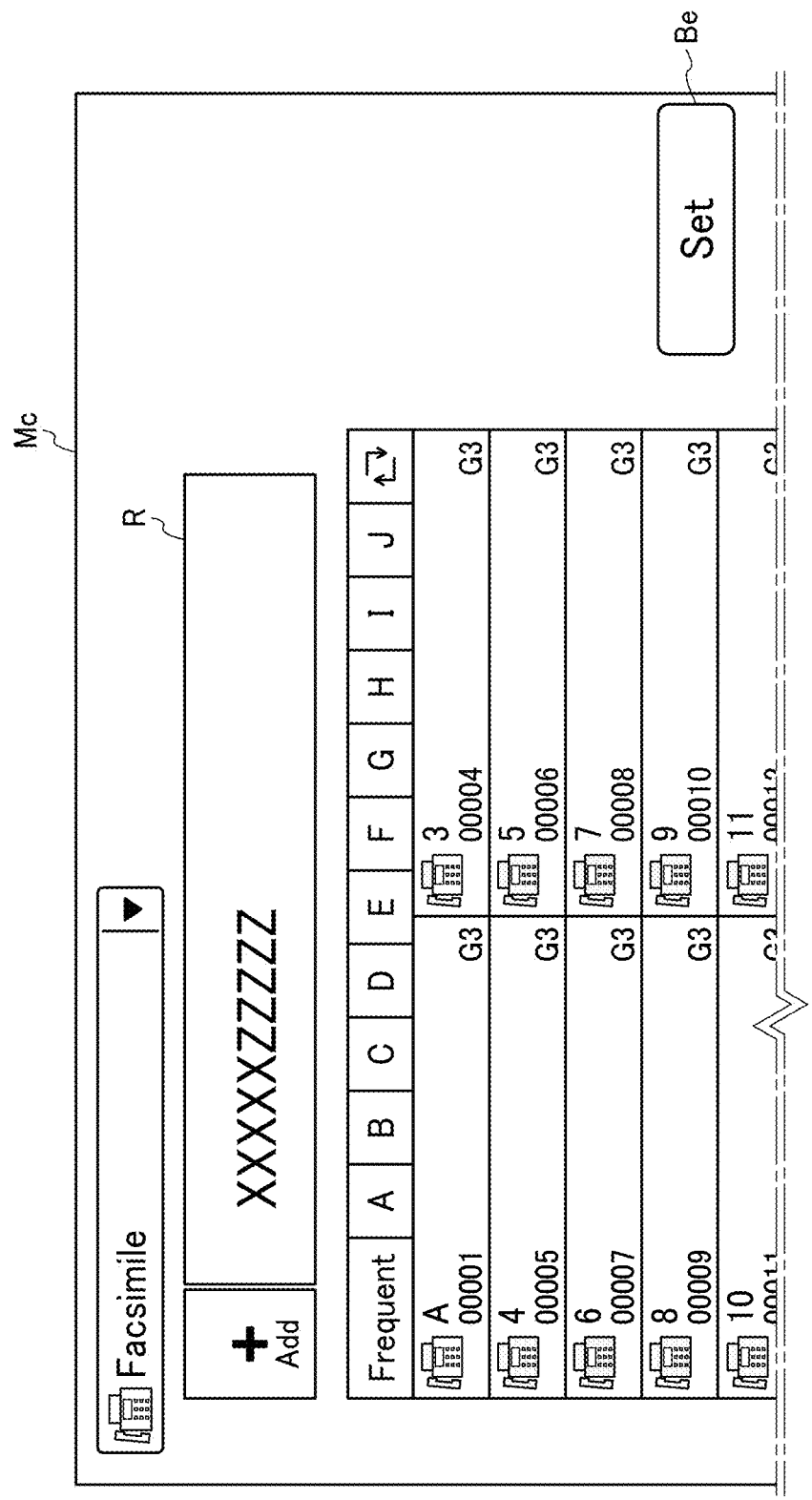
FIG. 4B is a schematic diagram illustrating a specific example of a destination designation screen, according to an embodiment of the present disclosure.

FIG. 4B is a schematic diagram illustrating a specific example of a destination designation screen Mc. The user is allowed to designate a desired destination to which the unprocessed information DG is to be transmitted (forwarded) in response to the batch operation during a time period in which the destination designation screen Mc is being displayed. As illustrated in FIG. 4B, the destination designation screen Mc includes a setting button Be.

The destination designation screen Mc is displayed at a suitable timing. In one example, the destination designation screen Mc is displayed before the start screen Ma is displayed. In another example, the destination designation screen Mc is displayed immediately after the batch processing button Ba on the start screen Ma is pressed, or the destination designation screen Mc is displayed immediately after the execution button Bd of the selection screen Mb is pressed. In still another example, the facsimile 100 is configured to accept a switching operation during a time period in which the start screen Ma or the selection screen Mb is displayed, and the start screen Ma and the selection screen Mb is once switched to the transmission destination designation screen Mc in response to the switching operation. In the above configuration, after a desired destination to which the unprocessed information DG is to be transmitted is designated, the current screen is switched to the previous screen (the start screen Ma or the selection screen Mb).

The facsimile 100 according to the present embodiment stores (registers) fax numbers of plural destinations in advance. On the destination designation screen Mc, the plural destinations stored in advance are displayed. For example, in response to a touch operation by a user on a given destination among the plural destinations displayed on the destination designation screen Mc, the given destination on which the touch operation is accepted is designated as a destination to which the unprocessed information DG is to be transmitted.

In addition, a user can operate an operation panel (numeric keypad) that is provided with the facsimile 100 for use of entering numerical values, to directly enter a fax number of a desired destination. The fax number that is directly entered as above is displayed in an area R on the destination designation screen Mc. In response to an operation (touching) on the setting button Be after the desired fax number is selected among the fax numbers stored in advance or after the fax number is directly entered, the selected fax number or the directly entered fax number is designated as a fax number of the destination.

In another example, the acceptance unit 106 is configured to accept input or selection of a destination such as a folder stored in the facsimile 100, a folder stored in an external device, and an e-mail address via the destination designation screen Mc.

Figure 5:
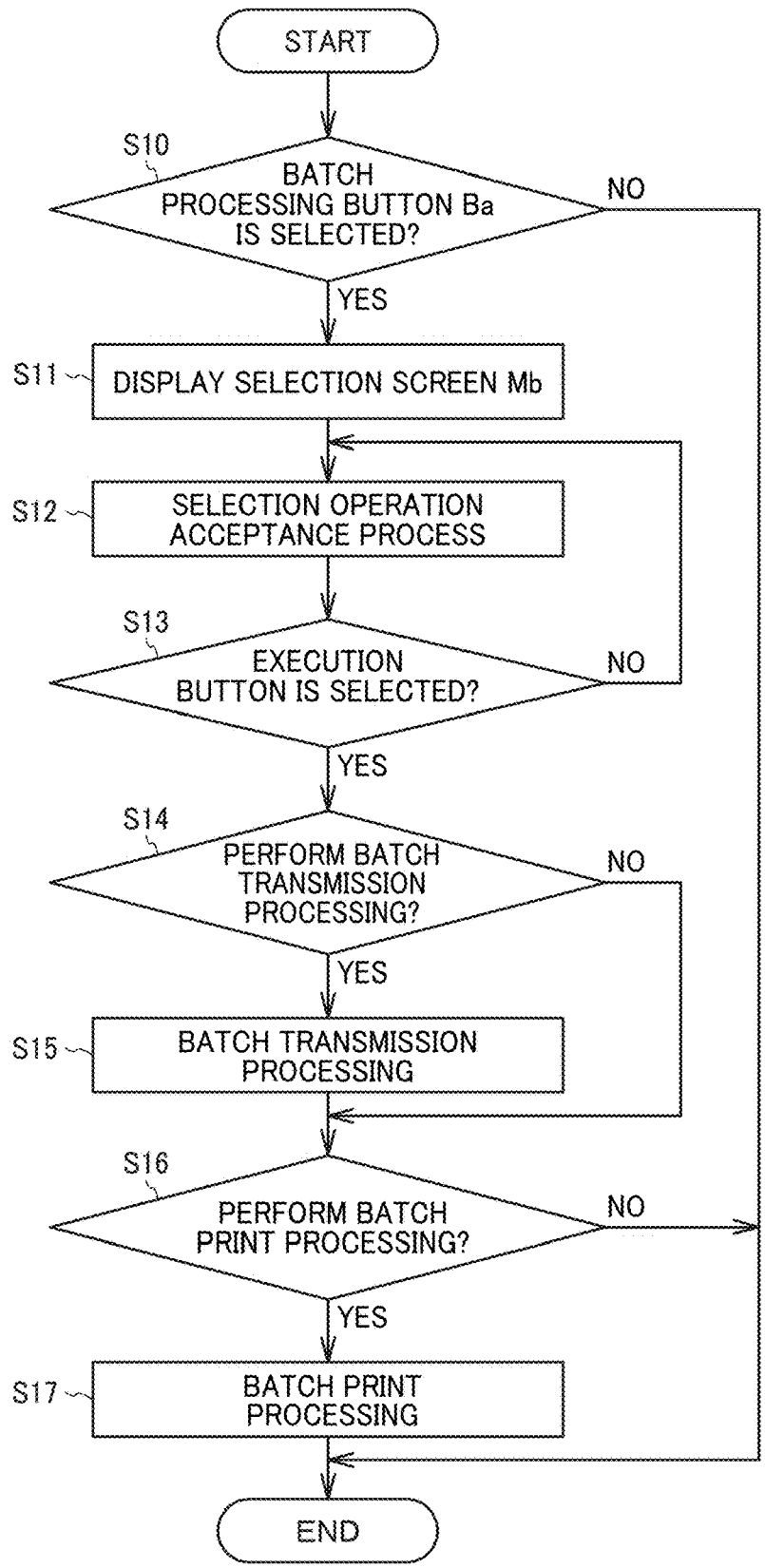
FIG. 5 is a flowchart illustrating steps in a batch operation control process performed by the facsimile, according to an embodiment of the present disclosure.

FIG. 5 is a flowchart illustrating steps in a batch operation control process performed by the facsimile 100. The batch operation control process is performed during a time period in which one or more pieces of unprocessed information DG are stored in the facsimile 100 (storage unit 101). When the batch operation control process is started, the facsimile 100 determines whether the batch processing button Ba (see FIG. 3A described above) is operated (S10). When the facsimile 100 determines that the batch processing button Ba is not operated (S10: No), the batch operation control process ends.

By contrast, when the facsimile 100 determines that the batch processing button Ba is operated (S10: Yes), the facsimile 100 displays the selection screen Mb (see FIG. 4A described above) (S11). The facsimile 100 performs a selection operation acceptance process (S12). In the selection operation acceptance process, the above-described selection operation is accepted, and processing to be performed in response to the batch operation, (i.e., print processing and transmission processing in the present embodiment) becomes selectable. Further, in the selection operation acceptance process, the above-described designation operation is accepted, and the plurality of pieces of unprocessed information DGs on which the print processing and/or transmission processing is to be performed in response to the batch operation becomes to be designated.

After performing the selection operation acceptance process, the facsimile 100 determines whether the execution button Bd (see FIG. 4A described above) is operated (S13). When the facsimile 100 determines that the execution button Bd is not operated (S13: No), the facsimile 100 repeatedly performs the selection operation acceptance process. When the facsimile 100 determines that the execution button Bd is operated (S13: Yes), the facsimile 100 performs processes of step S14 and subsequent steps. In other words, when the batch operation is performed, the processes of step S14 and subsequent steps are performed.

When the batch operation is performed, the facsimile 100 determines whether to performs the transmission processing in response to the batch operation (S14). Specifically, the facsimile 100 determines that the transmission processing is to be performed when the selection button Bc3 is in the selected state at the time of the batch operation. By contrast, the facsimile 100 determines that the transmission processing is not to be performed when the selection button Bc3 is in the non-selected state at the time of batch operation.

When the facsimile 100 determines that the transmission processing is to be performed in response to the batch operation (S14: Yes), the facsimile 100 performs batch transmission processing (S15). In the batch transmission processing, the transmission processing is performed on a plurality pieces of unprocessed information DGs stored in one or more folders Fo corresponding to one or more designation buttons Bb (see FIG. 4A above) that are in the designation state at the time of the batch operation, among the plurality pieces of the unprocessed information DGs. After the facsimile 100 performs the batch transmission processing, the operation proceeds to step S16. By contrast, when the facsimile 100 determines that the transmission processing is not to be performed in response to the batch operation (S14: No), the batch transmission processing is omitted, and the operation proceeds to step S16.

In step S16, the facsimile 10 determines whether to perform the print processing in response to the current batch operation (S16). Specifically, the facsimile 100 determines that the print processing is to be performed when the selection button Bc2 is in the selected state at the time of the batch operation. By contrast, the facsimile 100 determines that the print processing is not to be performed when the selection button Bc2 is in the non-selected state at the time of batch operation.

When the facsimile 100 determines that the print processing is to be performed in response to the batch operation (S16: Yes), the facsimile 100 performs batch print processing (S17). In the batch print processing, the print processing is performed on a plurality of pieces of unprocessed information DGs stored in one or more folders Fo corresponding to one or more designation buttons Bb (see FIG. 4A above) that are in the designation state at the time of the batch operation, among the plurality pieces of the unprocessed information DG. After the facsimile 100 performs the batch print processing, the batch operation control process ends. By contrast, when the facsimile 100 determines that the print processing is not to be performed in response to the batch operation (S16: No), the batch print processing is omitted, and the batch operation' control process ends.

According to the present embodiment, the specific processing (transmission processing, print processing) is collectively performed on the plurality of pieces of the unprocessed information DGs. Although the description of the present embodiment given above is of an example in which image information DG on which the display processing has not been performed yet is specified as the unprocessed information DG, the image information DG specified as the unprocessed information DG is not limited to the above example.

In another example, the image information DG on which the transmission processing has not been performed yet is specified as the unprocessed information DG, or the image information DG on which the print processing has not been performed yet is specified as the unprocessed information DG. In still another example, the image information DG on which none of the transmission processing, the print processing and the display processing are performed yet is specified as the unprocessed information DG.

Note that the apparatus that performs each of the above processes may be appropriately changed. Each of the above-described functions (the storage unit 101, etc.) may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

Second Embodiment

A description is now given of another embodiment of the present disclosure. Note that, in the embodiment described below, the same reference numbers are allocated to elements (members or components) having the same function as those of the first embodiment, and redundant descriptions thereof are omitted below.

FIG. 6A is a conceptual diagram illustrating an example of a sort rule management table. As illustrated in FIG. 6A, the sort rule management table associates a plurality of pieces of sender information with storage destination folders, respectively. Further, identifiers (IDs) are assigned to the plurality of pieces of sender information, respectively.

In response to receiving the image information DG, the facsimile 100 according to the second embodiment automatically sorts the received image information DG to any one of the folders F. Specifically, the sender information indicates a name of a sender that sends the image information DG. Further, the storage destination folder indicates any one of the folders F. The facsimile 100 extracts a name of the sender from an image represented by the image information DG, and searches the sort rule management table for the sender information indicating the name of the sender.

As illustrated in FIG. 6A, match conditions are defined for the plurality of sender information, respectively. The match conditions include "exact match" and "partial match". The facsimile 100 searches for the sender information that indicates a name that completely matches the name of the sender extracted from the image information DG and associated with the matching condition "exact match". Further, the facsimile 100 searches for the sender information that indicates a name that partially matches the name of the sender extracted from the image information DG and associated with the matching condition "partial match".

When the sender information is found as a result of the above search, the image information DG is stored (sorted) in a particular folder F corresponding to the found sender information. By contrast, when no sender information is found, the image information DG is stored in a common folder F that is determined in advance.

FIG. 6B is a conceptual diagram illustrating an example of the received document management table TB. In response to receiving image information DG, the facsimile 100 updates the received document management table TB. Specifically, in response to receiving the image information DG, the facsimile 100 adds reception information DT to the received document management table TB. The reception information DT includes information indicating a date and time when the image information DG is received, number information of the sender of the image information DG, a folder F in which the image information DG is stored, a name of the image information DG and the number of pages of the image. The received information DT further includes information indicating whether the display processing is performed on the image information DG (whether a user has read the image represented by the image information DG).

FIG. 7A is a schematic diagram illustrating an example of the start screen Ma, according to the second embodiment. The start screen Ma according to the second embodiment includes the batch processing button Ba, in substantially the same manner as the start screen Ma according to the first embodiment. On the other hand, although the name of the folder F is displayed on the start screen Ma according to the first embodiment, a name of the sender of the image information DG stored in the folder F is displayed on the start screen Ma according to the second embodiment, instead of the name of the folder F. Further, a display button Bf, a print button Bg, a transfer button Bh, and a delete button Bi are displayed on the start screen Ma according to the second embodiment.

As described below, a user can designate any of the plurality of pieces of the image information DG. In response to a touch operation on the display button Bf, the display processing is performed on the image information DG designated by the user. Further, in response to a touch operation on the print button Bg, the print processing is performed on the image information DG designated by the user. In substantially the same manner, in response to a touch operation on the transfer button Bh, the transmission processing is performed on the image information DG designated by the user. In response to a touch operation on the delete button Bi, the image information DG designated by the user is deleted.

During a time period in which the image information DG is designated, each of the above buttons Bf to Bi is displayed in the first mode. During a time period in which the image information DG is not designated, each of the above buttons Bf to Bi is displayed in the second mode. Further, when the user presses the batch processing button Ba illustrated in FIG. 7A, the execution unit 102 performs the specific processing on the plurality of pieces of unprocessed information DG stored in all the folders.

FIG. 7B is a schematic diagram illustrating a specific example of an in-folder screen Md. The in-folder screen Md is displayed in response to a touch operation on the name of the sender displayed on the start screen M. On the in-folder screen Md, a plurality of pieces of file information DF corresponding to the plurality of pieces of image information DG received from the sender on which the touch operation is performed are displayed. Each file information DF includes information indicating a reception date and time when the image information DG corresponding to the file information DF is received, a number information of the sender of the image information DG, and the number of originals. Each file information further includes information indicating whether the display processing has been performed on the image information DG.

In response to a touch operation on a desired file information DF, the image information DG corresponding to the file information DF on which the touch operation is performed is designated, and touch operation on the display button Bf, the print button Bg, the transfer button Bh. and the delete button Bi are enabled. In the present embodiment, in response to an operation on the batch processing button Ba during a time period in which the in-folder screen Md is being displayed, the print processing and the transmission processing are performed one or more pieces of image information DGs corresponding to one or more pieces of file information DF displayed on the in-folder screen Md.

In one example, in response to receiving an operation on the batch processing button Ba by the acceptance unit 106, the execution unit 102 performs the specific processing such as print processing of the unprocessed information DG under preset print conditions (printing settings such as color/black and white, and one-sided/double-sided) and the transmission processing to a preset destination. In other words, the execution unit 102 can be configured to perform the specific processing without displaying a screen that allows a user to enter setting information relating to the specific processing.

In another example, the start screen Ma and the in-folder screen Md include a batch processing button for executing only the print processing and a batch processing button for executing only the transmission processing. In other words, the batch processing buttons each corresponding to each of the plurality of specific processing may be displayed on the start screen Ma and the in-folder screen Md.

Figure 8:
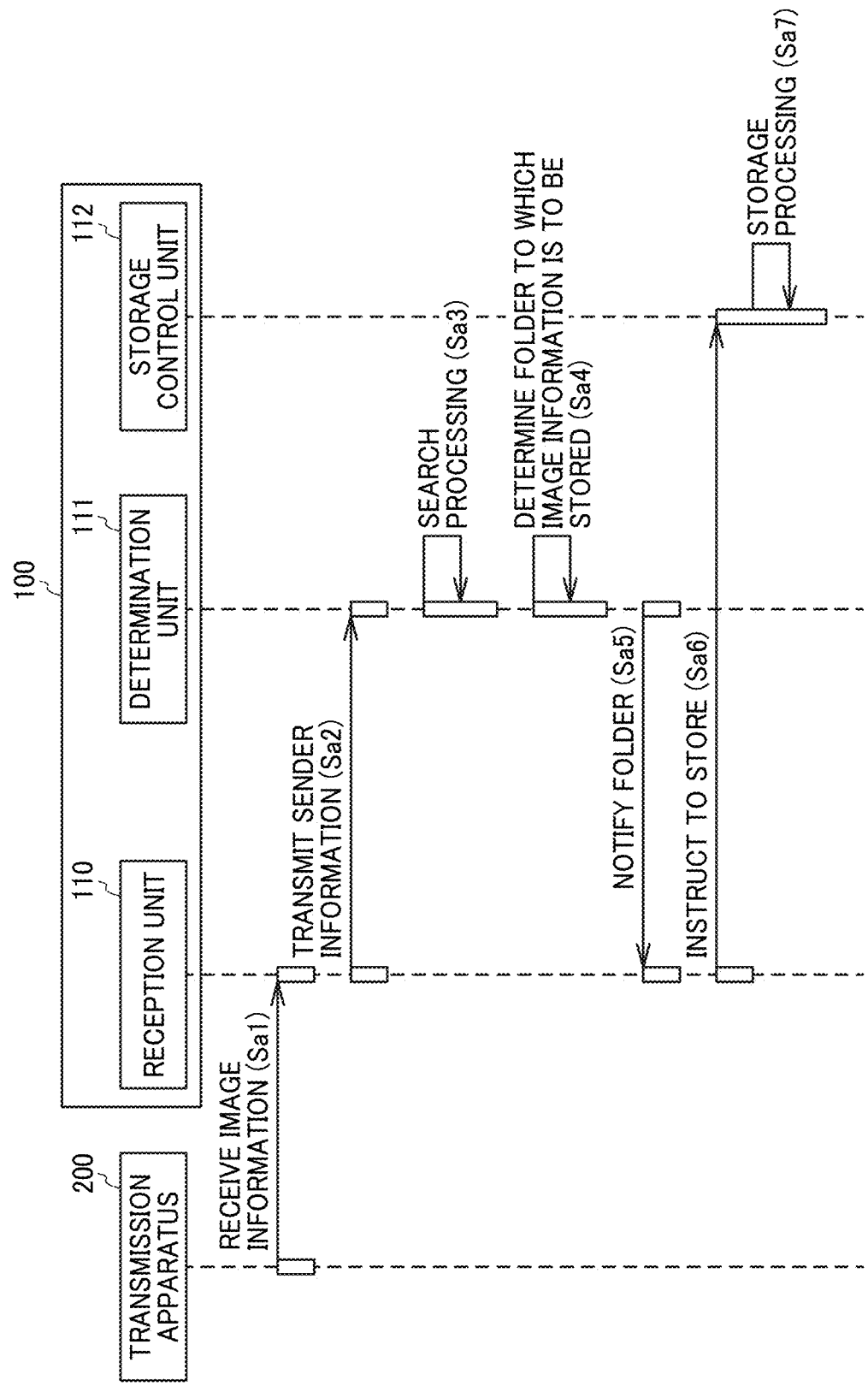
FIG. 8 is a sequence diagram illustrating a specific example of an operation performed by the facsimile, according to an embodiment of the present disclosure.

FIG. 8 is a sequence diagram illustrating a specific example of an operation performed by the facsimile 100, according to the second embodiment. As illustrated in FIG. 8, the facsimile 100 according to the second embodiment includes a reception unit 110, a determination unit 111, and a storage control unit 112.

The reception unit 110 receives image information DG from a transmission apparatus 200 (another facsimile) (Sa1). The reception unit 110 extracts sender information from the received image information DG and transmits the extracted sender information to the determination unit 111 (Sa2). In response to receiving the sender information, the determination unit 111 performs a search processing (Sa3). In the search processing, the determination unit 111 searches the sort rule management table for a sender indicated by the sender information transmitted in step Sa2. Then, the determination unit 111 determines a particular folder F corresponding to the sender found in the search processing (Sa4).

When no sender is found in the search processing, the determination unit 111 determines the common folder as a storage destination.

The determination unit 111 transmits a notification indicating the particular folder F or the common folder determined in step Sa4 (Sa5) to the reception unit 110. In response to receiving the notification, the reception unit 110 transmits a storage instruction to the storage control unit 112 (Sa6). In response to receiving the storage instruction, the storage control unit 112 stores the image information DG received in the step Sa1 in the particular folder F or the common folder determined in step Sa4 (Sa7).

A plurality pieces of image information stored in a storage may include unprocessed information (e.g., image information representing an image that a user has not yet view) on which particular processing (e.g., display processing) has not yet performed. The user often desires that the above-mentioned specific processing is performed on the unprocessed information.

It is assumed that a facsimile has a configuration that requires the user to designate each of all pieces of unprocessed information on which the specific processing is to be performed. In the above configuration, when there are many pieces of unprocessed information, it takes a long time for the user to designate each piece of the unprocessed information.

According to one or more embodiments of the present disclosure, specific processing is collectively performed on a plurality pieces of unprocessed information.

The embodiments described above are examples, and aspects of the present disclosure attain effects and advantages as described below.

First Aspect:

A facsimile (100) according to a first aspect includes a storage unit (101) that stores a plurality of pieces of image information (DG), an execution unit (102) configured to perform specific processing (printing processing, transmission processing) on image information, an identifying unit (103) that identifies unprocessed information (DG), which is information on which a particular processing (display processing) has not performed yet, among the plurality of pieces of image information, and an execution control unit (104) that enables the specific processing to be performed on a plurality of the unprocessed information among the plurality of pieces of image information. According to the present aspect, the specific processing is performed collectively on the plurality of pieces of unprocessed information.

Second Aspect:

The facsimile according to a second aspect includes an operation unit (105) configured to be operated, and an acceptance unit (106) that accepts an operation on the operation unit. When the operation (a touch operation on the batch processing button Ba) is accepted, the execution control unit enables the specific processing to be performed collectively on the plurality of pieces of the unprocessed information (displays the selection screen Mb). The facsimile according to the present aspect further includes a mode control unit (107) that controls the operation unit to be in a first mode (see FIG. 3A) during a time period in which the operation can be accepted, and controls the operation unit to be in a second mode (see FIG. 3B), which is different from the first mode, during a time period in which the operation cannot be accepted. The above configuration enables a user to intuitively recognize whether the batch operation can be accepted.

Third Aspect:

In the facsimile according to a third aspect, the storage unit stores the plurality of pieces of image information in a plurality of groups (folders Fo) respectively (see FIG. 2B), and the execution control enables the specific processing to be performed collectively on the unprocessed information belonging to one or more groups (designated folder Fo). The above configuration reduces inconveniences that the specific processing is performed on undesired unprocessed information DG, compared with a configuration in which the specific processing is performed on all the unprocessed information DG.

Fourth Aspect:

A control method according to a fourth aspect is implemented by a computer and includes storing a plurality of pieces of image information (DG), identifying unprocessed information (DG), which is information on which a particular processing (display processing) has not performed yet, among the plurality of pieces of image information, enabling the specific processing to be performed collectively on a plurality of the unprocessed information among the plurality of pieces of image information, and performing the specific processing collectively on the plurality of pieces of the unprocessed information. According to the fourth embodiment, the same effect as in the first embodiment is obtained.

Fifth Aspect:

A program according to a fifth aspect causes a computer to execute each step in the control method according to the fourth embodiment. According to the fifth embodiment, the same effect as in the first embodiment is obtained.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

The invention claimed is:

1. A facsimile comprising:
a memory configured to store a plurality of pieces of image information; and
circuitry configured to
identify unprocessed information among the plurality of pieces of image information, the unprocessed information being pieces of information on which particular processing has not been performed,
enable specific processing to be performed collectively on a plurality of pieces of the unprocessed information,
accept an operation on a graphical user interface component,
control the graphical user interface component to be in a first mode during a time period in which the operation on the graphical user interface component can be accepted,
control the graphical user interface component to be in a second mode during a time period in which the operation on the graphical user interface component cannot be accepted in response to determining that there is no unprocessed information among the plurality of pieces of image information, the second mode being different from the first mode, and
perform the specific processing collectively on the plurality of pieces of the unprocessed information in response to accepting the operation.

2. The facsimile of claim 1, wherein the circuitry is further configured to:
  group the plurality of pieces of image information stored in the memory into a plurality of groups; and
  enable the specific processing to be performed collectively on the unprocessed information belonging to one or more groups among the plurality of groups.

3. The facsimile of claim 1, wherein the specific processing includes at least one of transmission processing or print processing.

4. The facsimile of claim 1, wherein the circuitry is further configured to:
  update a flag corresponding to a piece of image information of the plurality of pieces of image information in response to the particular processing being performed on the piece of image information; and
  identify the unprocessed information according to the flag.

5. The facsimile of claim 1, wherein the memory is further configured to store a table associating a file name of a piece of image information of the plurality of pieces of image information with at least one of a storage destination folder of the piece of image information, a read state of the piece of image information, a reception date, a reception time, a sender, or a number of pages included in the piece of image information.

6. The facsimile of claim 1, wherein the circuitry is further configured to:
  sort the plurality of pieces of image information into folders based on a sort rule, in response to receiving the plurality of pieces of image information.

7. A control method implemented by a computer, the control method comprising:
  storing a plurality of pieces of image information;
  identifying unprocessed information among the plurality of pieces of image information, the unprocessed information being pieces of information on which particular processing has not been performed;
  enabling specific processing to be performed collectively on a plurality of pieces of the unprocessed information;
  accepting an operation on a graphical user interface component;
  controlling the graphical user interface component to be in a first mode during a time period in which the operation on the graphical user interface component can be accepted;
  controlling the graphical user interface component to be in a second mode during a time period in which the operation on the graphical user interface component cannot be accepted in response to determining that there is not unprocessed information among the plurality of pieces of image information, the second mode being different from the first mode; and
  performing the specific processing collectively on the plurality of pieces of the unprocessed information in response to accepting the operation.

8. The control method of claim 7, wherein the specific processing includes at least one of transmission processing or print processing.

9. The control method of claim 7, further comprising:
  updating a flag corresponding to a piece of image information of the plurality of pieces of image information in response to the particular processing being performed on the piece of image information, and
  wherein the identifying the unprocessed information includes identifying the unprocessed information according to the flag.

10. The control method of claim 7, further comprising:
  associating a file name of a piece of image information of the plurality of pieces of image information with at least one of a storage destination folder of the piece of image information, a read state of the piece of image information, a reception date, a reception time, a sender, or a number of pages included in the piece of image information.

11. The control method of claim 7, further comprising:
  sorting the plurality of pieces of image information into folders based on a sort rule, in response to receiving the plurality of pieces of image information.

12. A non-transitory computer-executable storage medium storing a program that, when executed by processing circuitry, causes a computer to execute a method comprising:
  storing a plurality of pieces of image information;
  identifying unprocessed information among the plurality of pieces of image information, the unprocessed information being pieces of information on which particular processing has not been performed;
  enabling specific processing to be performed collectively on a plurality of pieces of the unprocessed information;
  accepting an operation on a graphical user interface component;
  controlling the graphical user interface component to be in a first mode during a time period in which the operation on the graphical user interface component can be accepted;
  controlling the graphical user interface component to be in a second mode during a time period in which the operation on the graphical user interface component cannot be accepted in response to determining that there is not unprocessed information among the plurality of pieces of image information, the second mode being different from the first mode; and
  performing the specific processing collectively on the plurality of pieces of the unprocessed information in response to accepting the operation.

13. The non-transitory computer-executable storage medium of claim 12, wherein the specific processing includes at least one of transmission processing or print processing.

14. The non-transitory computer-executable storage medium of claim 12, wherein the method further comprises:
  updating a flag corresponding to a piece of image information of the plurality of pieces of image information in response to the particular processing being performed on the piece of image information, and
  wherein the identifying the unprocessed information includes identifying the unprocessed information according to the flag.

15. The non-transitory computer-executable storage medium of claim 12, wherein the method further comprises:
  associating a file name of a piece of image information of the plurality of pieces of image information with at least one of a storage destination folder of the piece of image information, a read state of the piece of image information, a reception date, a reception time, a sender, or a number of pages included in the piece of image information.

16. The non-transitory computer-executable storage medium of claim 12, wherein the method further comprises:
  sorting the plurality of pieces of image information into folders based on a sort rule, in response to receiving the plurality of pieces of image information.

* * * * *